United States Patent [19]
Kelly, Jr.

[11] 3,724,565
[45] Apr. 3, 1973

[54] METHOD OF CONTROLLING LOST CIRCULATION
[75] Inventor: John Kelly, Jr., Arlington, Tex.
[73] Assignee: Mobil Oil Corporation
[22] Filed: Nov. 12, 1971
[21] Appl. No.: 198,247

[52] U.S. Cl. .................................175/72, 166/294
[51] Int. Cl. ....E21b 21/04, E21b 33/13, E21b 43/00
[58] Field of Search ....175/72, 70, 65; 166/292, 294, 166/293, 300; 252/8.5 LC

[56] References Cited

UNITED STATES PATENTS

| | | | |
|---|---|---|---|
| 2,531,812 | 11/1950 | Hauser | 252/8.5 |
| 2,637,692 | 5/1953 | Nahin | 252/8.5 |
| 2,675,353 | 4/1954 | Dawson | 252/8.5 |
| 2,776,713 | 1/1957 | Morgan et al. | 166/293 |
| 2,800,964 | 7/1957 | Garrick | 166/293 X |
| 2,990,016 | 6/1961 | Goins, Jr. et al. | 166/293 |
| 3,070,179 | 12/1962 | Moore | 175/72 |
| 3,411,581 | 11/1968 | Alpha | 175/72 X |
| 3,448,800 | 6/1969 | Parker et al. | 175/72 X |
| 3,461,980 | 8/1969 | Kelly, Jr. | 175/72 X |
| 3,467,208 | 9/1969 | Kelly, Jr. | 175/72 |

*Primary Examiner*—Stephen J. Novosad
*Attorney*—William J. Scherback et al.

[57] ABSTRACT

This specification discloses a method of controlling lost circulation in drilling operations. In carrying out the method of the invention, an aqueous mixture of a dispersing agent and a water dispersible oleophilic colloid is introduced into the well. This aqueous mixture is circulated down the well and into the vicinity of a formation into which lost circulation is occurring. The aqueous mixture is there mixed with an oleaginous liquid and a gel is formed which tends to plug the formation into which lost circulation is occurring. The oleophilic colloid may be a normally water swellable clay such as bentonite which has been treated to render it oleophilic. The oleaginous liquid may comprise an oil-base drilling fluid utilized in drilling of the well.

9 Claims, No Drawings

METHOD OF CONTROLLING LOST CIRCULATION

BACKGROUND OF THE INVENTION

This invention relates to the drilling of wells into the earth's crust and more particularly to a new and improved method of lost circulation control in such drilling operations.

Typically, wells are extended into the earth's crust to desired subterranean locations, e.g. hydrocarbon-bearing formations, through the application of rotary drilling techniques. In the rotary drilling of a well, a drilling fluid is circulated through the well in order to remove the cuttings therefrom. The drilling fluid may be gaseous or liquid, although in most rotary drilling procedures, the drilling fluid comprises a suitable liquid either alone or in the form of a mud, i.e., a liquid medium having solids suspended therein. The drilling fluid may comprise either an aqueous-base or an oil-base liquid medium. The liquid medium used in an oil-base drilling fluid may be a relatively pure oleaginous liquid such as crude petroleum oil or diesel oil, or it may be an inverted emulsion, i.e., a water-in-oil emulsion, in which oil forms a continuous phase. Such oil-base fluids may be used to advantage where the formation being drilled is a suspended oil or gas producer, or where unstable shale formations are encountered. In an aqueous-base drilling fluid, the liquid medium typically is fresh water, salt water, or an oil-in-water emulsion in which the water is the continuous phase. Where practical, it usually is desirable for reasons of economy to use an aqueous-base drilling fluid throughout much of the drilling operation.

The suspended solids in an aqueous-base drilling mud typically take the form of clays of the kaolinite, montmorillonite, or illite groups. Such clays are utilized to impart desirable thixotropic properties to the drilling mud and also serve to coat the walls of the well with a relatively impermeable sheath commonly termed a filter cake which retards the loss of fluid from the well into the formations penetrated by the well. Exemplary of the clays which may be utilized in aqueous-base drilling muds is bentonite, which is a montmorillonite-type clay. Bentonite is dispersed within the aqueous-base liquid as colloidal particles and imparts various degrees of thixotropy to the mud. Clays, such as those described above which have been rendered oleophilic by suitable treatment, may be used in oil-base drilling fluids. For example, the Bentones which are formed by treating bentonites with lone-chain amines are thickening agents which are widely used in oil-base drilling fluids. Other material such as lamp black and blown asphalt may also be used as viscosifiers in oil-base drilling fluids.

In addition to various clays such as mentioned above, a drilling fluid also may contain one or more weighting agents which function to increase the density of the fluid such that it will offset high pressures which may be encountered during the drilling operation. Examples of weighting agents which may be used in either aqueous-base or oil-base fluids are heavy minerals such as barite (barium sulfate) and galena (lead sulfide).

One difficulty which is often encountered in drilling operations is "lost circulation" which involves a loss of unacceptably large amounts of drilling fluid into a formation penetrated by the well. Such a formation is commonly termed a "lost circulation zone". Lost circulation may occur when the well encounters a formation of unusually high permeability or one which has naturally occurring fractures or fissures. Also, a formation may be fractured by the hydrostatic pressure of the drilling fluid, particularly when a changeover is made to a relatively heavy mud in order to control high formation pressures.

Numerous techniques have been developed in order to control lost circulation. One common expedient is to increase the viscosity of the drilling fluid in order to increase its resistance to flow into the formation. Another technique involves the addition of bulk material, such as cottonseed hulls, sawdust, or ground walnut shells to the drilling fluid. Also, it has been proposed to place a "soft plug" such as a gel formed by a liquid-clay dispersion into the lost circulation zone. For example, as disclosed in U.S. Pat. No. 2,800,964 to Garrick, a gel may be formed within the well by mixing an aqueous liquid and an oil dispersion of a hydrophilic clay, and the gel forced into the lost circulation zone. In another procedure, a hydraulic cement slurry may be placed in the lost circulation zone and allowed to set.

My invention disclosed in U.S. Pat. No. 3,467,208 is directed to a method of controlling lost circulation in drilling operations. An aqueous suspension of an oleophilic colloid which is both water and oil dispersible is introduced into a drill string which extends into a well. The aqueous suspension is circulated through the drill string and into the wellbore where it is contacted with an oleaginous liquid to form a gel which tends to plug the formation into which lost circulation occurs.

SUMMARY OF THE INVENTION

The present invention is directed to an improvement to my aforementioned U.S. Pat. No. 3,467,208. This improvement concerns the inclusion of a dispersing agent in the aqueous suspension of an oleophilic colloid thereby allowing an increased amount of oleophilic colloid to be employed. Thus, in accordance with this invention there is provided a method of alleviating fluid loss into a subterranean formation penetrated in the drilling of a well thereinto. An aqueous mixture of a dispersing agent and a water dispersible oleophilic colloid which acts as an oleaginous gelling agent is introduced into the well. This aqueous mixture is circulated down the well and into the vicinity of the formation and is there mixed with an oleaginous liquid. The oleophilic colloid is thereby dispersed into the oleaginous liquid and forms a gel which tends to plug the formation and mitigate the fluid loss thereinto.

DESCRIPTION OF THE PREFERRED EMBODIMENTS

The gelling agent used in carrying out the present invention may be any suitable oleophilic colloid which is both water and oil dispersible and which exhibits good gelling action in an oleaginous liquid while exhibiting relatively little or no gelling action in an aqueous liquid. Particularly suitable for use in the present invention are the normally water swellable clays which have undergone treatment to render them oleophilic. Exemplary of suitable oleophilic clays are the bentonites or other clays which have been treated with an oil-wetting surfactant such as a long-chain quaternary or nonquaternary amine. For a more detailed description of such clays and their method of preparation, reference is made to CHEMICAL ENGINEERING, March 1952, pp. 226-230; U.S. Pat. No. 2,531,812 to Hauser; and U.S. Pat. No. 2,675,353 to Dawson. Suitable oleophilic clays also may be prepared by dehydrating a hydrophilic clay such as bentonite, and then treating the dehydrated clay with a glycol or glycol ether. For a more detailed description of this procedure, reference is made to U.S. Pat. No. 2,637,692 to Nahin. Suitable olephilic colloids are available under the trade names of Geltone and Petrotone.

The dispersing agent employed in carrying out the present invention may be any suitable material which functions to promote and maintain separation of the individual, extremely fine particles of solid which are usually of colloidal size. As will be recognized by those skilled in the art, various such dispersing agents are conventionally employed in drilling muds in order to maintain adequate dispersion of clays added to impart desired rheological properties to such muds. Also, as will be recognized by those skilled in the art certain dispersing agents are more effective in alkaline environments and therefore it is desirable to adjust the pH of the liquid medium into which the dispersing agent is added to an alkaline pH. The pH may be adjusted, for example, by adding caustic soda to the liquid medium. Examples of dispersing agents which may be used are lignites, chrome lignosulfonates, other lignosulfonates such as iron, nickel, and cobalt lignosulfonates, tannins, and complex phosphates such as polyphosphates and pyrophosphates. Dispersing agents which have been found to give particularly good results when used in accordance with this invention and which are therefore preferred are chrome lignosulfonates and ferrochrome lignosulfonates.

In rotary drilling there is employed a drill string which carries on its lower end a drill bit having one or more openings for the passage of drilling mud between the drill string and the well. The drill string extends through a rotary table on the floor of the drilling rig and is supported by the rig through the means of a drawworks system. Typically, the drilling mud is withdrawn from a mud pit near the surface of the well and passed into the drill string via a rotary swivel. The drilling mud is pumped downwardly through the drill string and outwardly into the well through the openings in the drill bit. The mud is then pumped to the surface of the earth through the annulus between the drill string and the wall of the well. At the surface the mud may be passed through a suitable separation zone where drill cuttings and other entrained solids may be separated and thence passed to the mud pits for reintroduction into the drill string. So-called "reverse circulation" drilling may also be employed wherein the drilling mud is pumped down the well through the annulus between the drill string and the wall of the well and thence through the openings in the bit and up the drill string to the surface of the earth.

The invention normally will be used most advantageously in conjunction with a drilling procedure employing an oil-base drilling fluid, which drilling fluid is pumped downward through the drill string and upward to the surface of the earth through the annulus. Accordingly, this invention is described primarily with reference to such a procedure.

When a lost circulation zone is encountered during the drilling procedure, as evidenced for example by a decrease or loss of drilling fluid return from the well annulus, the introduction of the drilling fluid in the drill string is temporarily suspended and a slug of an aqueous mixture of a dispersing agent and an oleophilic colloid is introduced into the drill string. The aqueous mixture may include other materials in addition to the dispersing agent and a water dispersible oleophilic colloid. For example, as disclosed in copending application Ser. No. 198,357, entitled TECHNIQUE FOR CONTROLLING LOST CIRCULATION, by Joseph U. Messenger, filed of even date, the aqueous mixture may include inert particulate materials such as barite, gilsonite, silica, and calcium carbonate. Thereafter, the drilling fluid is again introduced into the drill string and the aqueous slug is entrained within the column of drilling fluid and circulated down the drill string and thence into the well through the outlet ports of the drill bit. As the aqueous mixture enters the well it is mixed with the oleaginous liquid provided by the oil-base drilling fluid and reacts with this liquid to form a gel.

In accordance with an embodiment of this invention, a pumpable aqueous mixture of a dispersing agent and a water dispersible oleophilic colloid which acts as an oleaginous gelling agent is formed by adding the dispersing agent to the water prior to or concomitantly with the addition of the oleophilic colloid thereto. The addition of the dispersing agent to the water enables the addition of an increased amount of oleophilic colloid to the water while maintaining a pumpable slurry, that is, a slurry which has a viscosity sufficiently low that it may be circulated within the well. The addition of the dispersing agent to the water prior to or concomitantly with the addition of the oleophilic colloid thereto facilitates the forming of a pumpable aqueous mixture containing an increased amount of oleophilic colloid.

The amount of dispersing agent employed in carrying out this invention is that amount which will allow a sufficient amount of oleophilic colloid to be dispersed in water but less than that amount which will reduce the efficiency of the gelling action when the aqueous mixture containing the oleophilic colloid is mixed with an oleaginous liquid. The specific amount of any selected dispersing agent to be employed may readily be determined by straightforward tests wherein various amounts of dispersing agent and oleophilic colloids are mixed together to form a pumpable slurry which will gel when mixed with an oleaginous liquid. A typical formulation for use in controlling lost circulation is obtained by forming a slurry comprised of the following materials in approximately the concentrations specified: water — 350 cubic centimeters, ferrochrome lignosulfonates — 4.6 grams, caustic soda — 2.3 grams, and an oleophilic colloid available under the trade name of Geltone — 350 grams.

Ideally, the drill bit will be located adjacent the lost circulation zone so that as the gel is forming, it is displaced immediately into the lost circulation zone where the gelling reaction continues until a stiff plug is formed, thus sealing the lost circulation zone. However, in many cases, the precise depth of the lost circulation zone will be unknown. In such cases, it is important to maintain circulation of the drilling fluid in order to ensure that the plug that is formed by mixing the oleaginous liquid with the aqueous mixture of a dispersing agent and a water dispersible oleophilic colloid is forced into the lost circulation zone. Due to its thixotropic character, this plug will tend to stiffen after it is displaced into the formation where it is subject to lower shear stresses than while circulated within the well.

It is contemplated that in most cases, adequate contact between the aqueous mixture of the dispersing agent and colloid and the oleaginous liquid can be obtained simply by passing the mixture through the outlet ports of the drill bit into the well. However, if more intimate mixing is desired, the drill string may be withdrawn from the well and equipped with a mixing sub such as that described in U.S. Pat. No. 2,800,964. Thereafter, the drill string may be reinserted within the well and the aqueous mixture introduced as described above.

If desired, a suitable oleaginous liquid, such as the oil-base drilling fluid used during normal operations, may be pumped down the well annulus in conjunction with circulation of the aqueous mixture through the drill string. These steps should be correlated such that fluid is being pumped into the annulus as the aqueous mixture is displaced from the drill string into the well. This will further promote mixing of the aqueous mixture and the oleaginous liquid and will provide a continuous supply of oleaginous liquid to the mixing zone.

By introducing the aqueous mixture of dispersing agent and oleophilic colloid into the drill string as a discrete slug, the possibility of significant contact between the oleophilic colloid and the oil-base drilling fluid within the drill string is substantially reduced. Thus, the tendency of the oleophilic colloid to go into an oleaginous dispersion within the drill string is reduced with the result that there is little chance of forming a stiff gel within the drill string.

In order to further ensure against the oleophilic colloid within the aqueous mixture contacting the oil-base drilling fluid within the drill string, it is preferred in carrying out the invention to immediately precede the aqueous mixture with a liquid buffer system comprising an aqueous liquid such as fresh water, brine, or if desired, an aqueous-base drilling fluid having hydrophilic clays dispersed therein. The buffer system normally will comprise a relatively small amount, e.g., on the order of one-half to five barrels, depending upon the depth to the end of the drill string which typically may vary from about 1,000 to 25,000 feet. A large amount of the liquid buffer system normally should be avoided in order to ensure that contact of the aqueous mixture of dispersing agent and the oleophilic colloid and the oil-base drilling fluid will take place after the aqueous mixture enters the well from the drill string. The aqueous buffer liquid should, of course, be substantially free of oleophilic colloids.

It also will be desired in many cases to introduce a second buffer system into the drill string immediately following the aqueous suspension of oleophilic colloid. This buffer system, which may be identical to the first-injected buffer system, is utilized in order to reduce the possibility of contact within the drill string between the aqueous suspension of oleophilic colloid and the subsequently introduced oil-base drilling fluid.

Where the oil-base drilling fluid is an inverted emulsion, it usually will be desirable to utilize as the buffer system an aqueous liquid as described above which is preceded by a substantially water-free oleaginous liquid such as diesel oil, crude oil, etc. The oleaginous buffer liquid is employed in this instance primarily for the purpose of preventing direct contact within the drill pipe between the aqueous buffer liquid and the inverted emulsion which may cause the emulsion to revert to an oil-in-water emulsion. A second buffer system comprising a slug of aqueous buffer liquid followed by a slug of oleaginous buffer liquid may be introduced into the drill string immediately following the aqueous mixture of dispersing agent and oleophilic colloid. The amount of oleaginous liquid used in such buffer systems may be relatively small, e.g., on the order of one-half to two and one-half barrels, depending upon the depth of the well.

When drilling with an aqueous-base drilling fluid, a procedure similar to that described above may be carried out when lost circulation occurs. In this case, introduction of the aqueous-base drilling fluid into the drill string is suspended and an aqueous mixture of a dispersing agent and an oleophilic colloid is introduced into the drill string and circulated downwardly therethrough and into the wellbore. Preceding and/or following the aqueous mixture, an oleaginous liquid such as diesel oil, crude oil, etc., is introduced into the drill string. This oleaginous liquid is introduced for the purpose of mixing with the oleophilic colloid within the wellbore and forming a gel. A sufficient amount of oleaginous liquid for this purpose should be introduced into the drill string. For example, it usually will be desirable to introduce at least five barrels of oleaginous liquid. Preferably, the oleaginous liquid is introduced into the drill string ahead of the aqueous mixture such that it will be present within the well when the aqueous mixture enters the well from the drill string. Also, it usually will be desirable to introduce a buffer system of an aqueous liquid into the drill string between the oleaginous liquid and the aqueous mixture. This buffer liquid functions similarly as described above in order to prevent premature contact between the aqueous mixture and the oleaginous liquid.

Laboratory tests carried out in accordance with this invention have shown that the addition of a dispersing agent into water prior to or concomitantly with the addition of an oleophilic colloid thereto enables a greatly increased amount of oleophilic colloid to be added to the water while maintaining a pumpable mixture. Contacting this mixture having an increased amount of oleophilic colloid therein with an oleaginous liquid results in the forming of a stiff gel much more rapidly than is the case when the dispersing agent is absent the mixture and a lesser amount of oleophilic colloid is necessarily contained therein. In these laboratory tests, an aqueous mixture was formed by adding 150 grams of oleophilic colloid to 150 cc's of water into which 2 grams of chrome lignosulfonate and 1 gram of caustic soda had been placed. This slurry was judged to be pumpable and appeared to be less viscous after mixing had stopped and the sample allowed to stand for a period of one-half hour. This slurry was mixed with 175 cc's of diesel oil and a stiff gel was rapidly formed.

I claim:

1. In the drilling of a well, the method of alleviating fluid loss into a subterranean formation penetrated by said well, comprising:
   introducing into said well an aqueous mixture of a dispersing agent and a water dispersible oleophilic colloid which acts as an oleaginous gelling agent;
   circulating said aqueous mixture down said well and into the vicinity of said formation; and
   mixing said aqueous mixture with an oleaginous liquid whereby said oleophilic colloid is dispersed in said oleaginous liquid and forms a gel.

2. The method of claim 1 wherein said dispersing agent is selected from the group consisting of lignites, lignosulfonates, tannins, and complex phosphates.

3. The method of claim 2 wherein said dispersing agent is selected from the group consisting of chrome lignosulfonates and ferrochrome lignosulfonates.

4. The method of claim 1 wherein said oleophilic colloid is a normally water swellable clay which has been treated to render it oleophilic.

5. The method of claim 1 wherein said oleaginous liquid comprises an oil-base drilling fluid present in said well when said aqueous mixture is introduced.

6. The method of claim 1 wherein said aqueous mixture is adjusted to an alkaline pH by the inclusion of a pH-adjusting chemical.

7. In the drilling of a well, the method of alleviating fluid loss into a subterranean formation penetrated by said well, comprising:
   forming a pumpable aqueous mixture of a dispersing agent and a water dispersible colloid which acts as an oleaginous gelling agent;
   circulating said aqueous mixture down said well and into the vicinity of said formation; and
   mixing said aqueous mixture with an oleaginous liquid whereby said oleophilic colloid is dispersed in said oleaginous liquid and forms a gel.

8. The method of claim 7 wherein said pumpable aqueous mixture is formed by adding said dispersing agent into water no later than the addition of said water dispersible colloid into said water.

9. The method of claim 8 further comprising adding a pH-adjusting chemical to said water to adjust the pH of said water to an alkaline pH and thereby improve the effectiveness of said dispersing agent.

* * * * *